US008731278B2

(12) United States Patent
Cohen et al.

(10) Patent No.: US 8,731,278 B2
(45) Date of Patent: May 20, 2014

(54) SYSTEM AND METHOD FOR SECTIONING A MICROSCOPY IMAGE FOR PARALLEL PROCESSING

(75) Inventors: Avrum Cohen, Downingtown, PA (US); Dihui Hong, Chester Springs, PA (US)

(73) Assignee: Molecular Devices, Inc., Sunnyvale, CA (US)

( * ) Notice: Subject to any disclaimer, the term of this patent is extended or adjusted under 35 U.S.C. 154(b) by 82 days.

(21) Appl. No.: 13/209,992

(22) Filed: Aug. 15, 2011

(65) Prior Publication Data
US 2013/0044940 A1 Feb. 21, 2013

(51) Int. Cl.
*G06K 9/00* (2006.01)

(52) U.S. Cl.
USPC .......................................................... 382/154

(58) Field of Classification Search
None
See application file for complete search history.

(56) References Cited

U.S. PATENT DOCUMENTS

| | | | | |
|---|---|---|---|---|
| 3,941,980 | A * | 3/1976 | Okamoto et al. | 377/3 |
| 7,675,523 | B2 * | 3/2010 | Ushida et al. | 345/537 |
| 2004/0264765 | A1 * | 12/2004 | Ohba | 382/154 |
| 2006/0088197 | A1 | 4/2006 | Han | |
| 2008/0212865 | A1 | 9/2008 | Zhu et al. | |
| 2008/0267469 | A1 | 10/2008 | Kawabata et al. | |
| 2008/0285795 | A1 * | 11/2008 | Maddison et al. | 382/100 |
| 2009/0268035 | A1 * | 10/2009 | Knoedgen et al. | 348/187 |
| 2010/0067774 | A1 | 3/2010 | Marcelpoil et al. | |
| 2011/0038523 | A1 * | 2/2011 | Boardman | 382/133 |
| 2011/0115896 | A1 * | 5/2011 | Doehring et al. | 348/79 |

FOREIGN PATENT DOCUMENTS

WO    WO 9904244 A1 *  1/1999  ............. G01N 15/14

OTHER PUBLICATIONS

International Search Report from International Patent Application No. PCT/US2012/048666, Date of Mailing: Dec. 27, 2012.

* cited by examiner

*Primary Examiner* — Stephen R Koziol
*Assistant Examiner* — Delomia Gilliard
(74) *Attorney, Agent, or Firm* — Bella Fishman

(57) ABSTRACT

A computer-implemented system and method of processing a microscopy image are provided. A microscopy image is received, and a configuration for an image section that includes a portion of the microscopy image is determined. Multiple image sections are respectively assigned to multiple processing units, and the processing units respectively process the image sections in parallel. One or more objects are determined to be respectively present in the image sections, and the objects present in the image sections are measured to obtain object data associated with the objects.

20 Claims, 11 Drawing Sheets

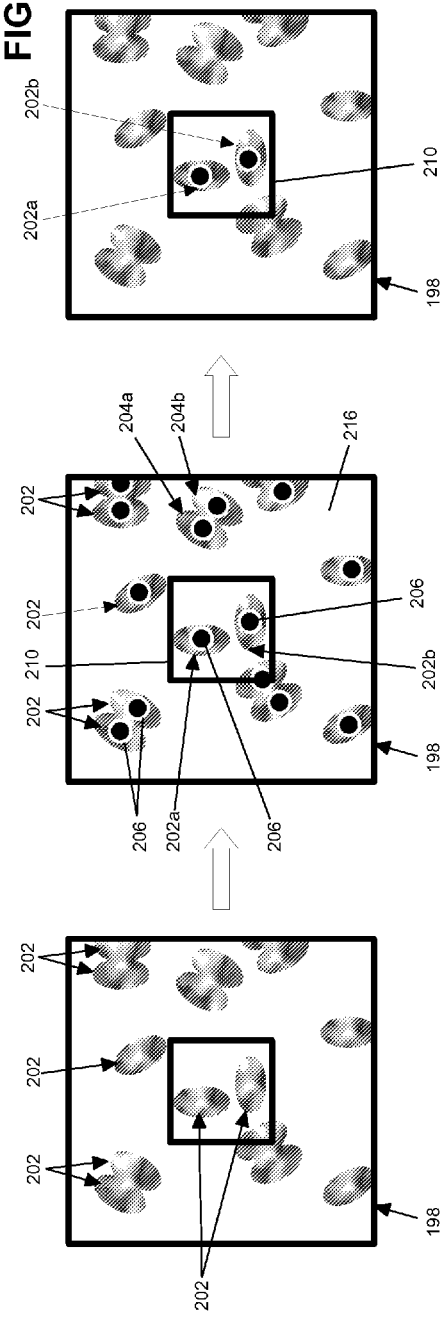

SYSTEM AND METHOD FOR SECTIONING A MICROSCOPY IMAGE FOR PARALLEL PROCESSING

FIELD OF THE INVENTION

This invention relates to image processing and more particularly to processing microscopy images.

BACKGROUND

Recognizing and identifying objects in a microscopy image may take significant processing time, which may affect time-sensitive tasks that rely on information related to objects in the microscopy image. For example, relatively long microscopy image processing times may make it difficult for users to timely respond to or modify various conditions during the course of an experiment. In another example, relatively long microscopy image processing times may make it difficult to track the lives of cells in a series of microscopy images or adjust the position of a sample in order to keep a particular cell or object in the microscopy image within a field of view.

Further, relatively long microscopy image processing times may also affect the throughput of automated systems such as, for example, high content screening systems. High content screening is an automated image-based approach to analyzing microscopy images in the fields of biological research and drug discovery. High content screening may acquire microscopy images at a rapid pace. In some circumstances, however, analysis of the microscopy images may not be able to keep pace with the acquisition rate.

As a result, a need exists for an improved approach to identification and measurement of objects in a microscopy image.

SUMMARY

A computer-implemented method of processing a microscopy image is provided. A microscopy image is received, and a configuration for an image section that includes a portion of the microscopy image is determined. Multiple image sections are respectively assigned to multiple processing units, and the processing units respectively process the image sections in parallel. One or more objects are determined to be respectively present in the image sections, and the objects present in the image sections are measured to obtain object data associated with the objects.

A system for processing a microscopy image is also provided. An image section determination module determines a configuration for an image section. The image section includes a portion of the microscopy image. A processing management module respectively assigns multiple image sections to multiple processing units. The processing units respectively process the image sections in parallel. An object identification module determines that one or more objects are respectively present in the image sections, and an object measurement module measures the objects present in the image sections to obtain object data associated with the objects.

BRIEF DESCRIPTION OF THE DRAWINGS

FIG. 7A is an example image section illustrating an example object detection process.

FIG. 7B is an example image section also illustrating an example object detection process.

DETAILED DESCRIPTION

The system and method described may be used to identify and measure objects in a microscopy image. Microscopy instruments may acquire the microscopy image, and the microscopy image may include, for example, a grid of pixels. The microscopy image is divided into multiple image sections that respectively include a portion of the microscopy image. Multiple processing units may respectively process the image sections simultaneously in parallel. As a result, the processing time needed to recognize and measure objects in the microscopy image is advantageously reduced. Furthermore, because the processing time for some functions may increase in a nonlinear fashion as the size of the microscopy image increases, additional speed benefits may be gained by sectioning the microscopy image for parallel processing.

Figure 1:
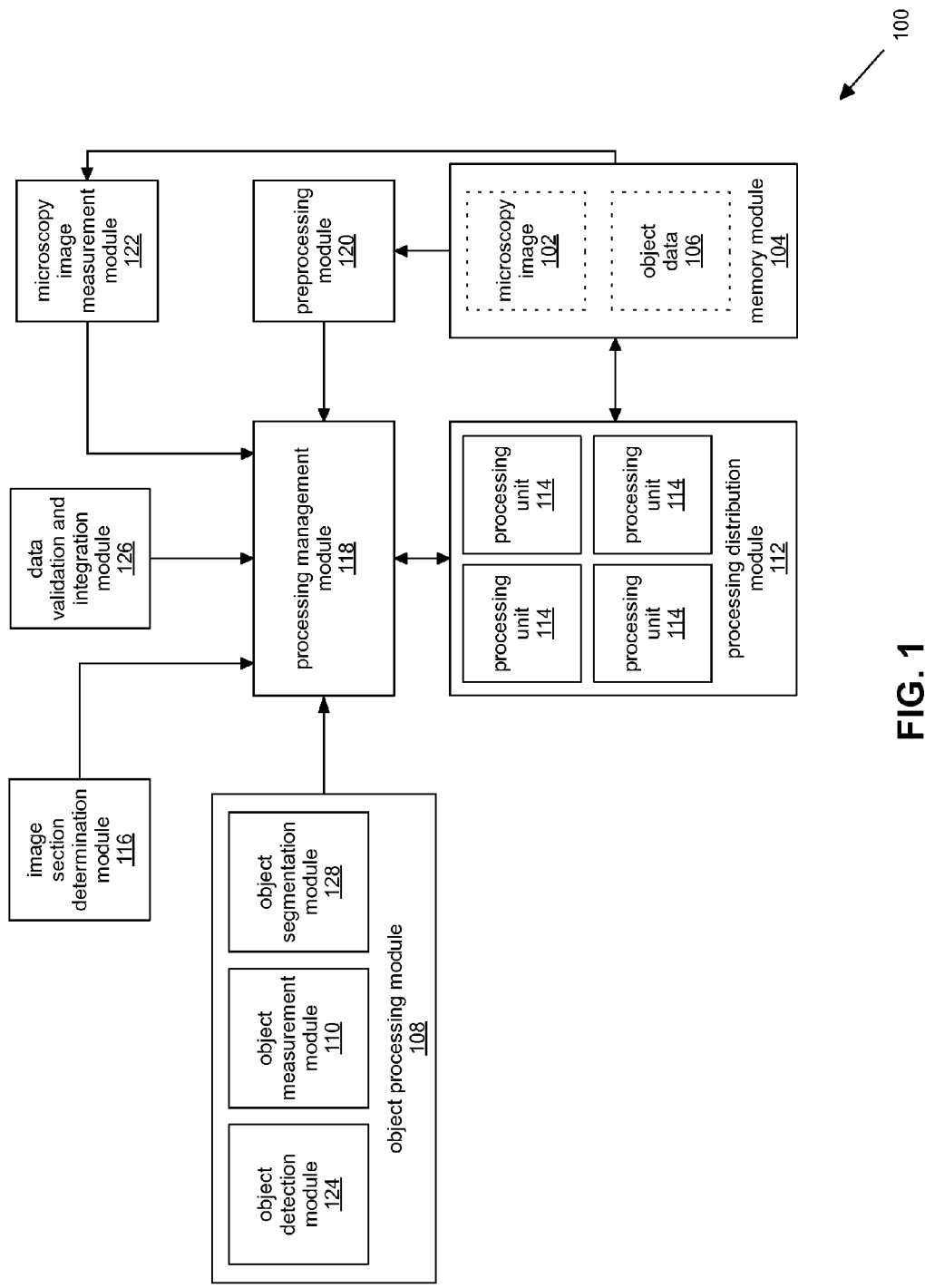
FIG. 1 is an example of an implementation of a microscopy image analysis system.

Referring to FIG. 1, an example of an implementation of a microscopy image analysis system 100 is shown. The microscopy image analysis system 100 includes various modules used to identify and measure objects in a microscopy image 102. In this example, the microscopy image analysis system 100 includes: a memory module 104 that stores the microscopy image 102 and data 106 relating to the objects in the microscopy image 102; an object processing module 108 that identifies objects in the microscopy image 102 and includes an object measurement module 110 that measures the objects in the microscopy image 102; and a processing distribution module 112 that distributes processing tasks among multiple processing units 114 so that the processing distribution module 112 may simultaneously process in parallel multiple sections of the microscopy image 102. The processing units 114 may reside at the microscopy image analysis system 100 as shown by way of example in FIG. 1. In some implementations, however, the processing units 114 may reside at another system in signal communication with the microscopy image analysis system 100.

The microscopy image analysis system 100 also includes: an image section determination module 116 that determines, for example, the number, size, and shape of the microscopy image sections; and a processing management module 118 that coordinates the image and object processing activities. The microscopy image analysis system 100 may also include: a preprocessing module 120 that performs preprocessing operations on the microscopy image 102 before the image sections are processed; and a microscopy image measurement module 122 that measures the microscopy image 102 as a whole.

As discussed further below, the object processing module 108, in this example, includes: an object detection module 124 that determines whether objects are present in an image section; and an object segmentation module 128 that determines which pixels in the microscopy image 102 are associated with detected objects. As mentioned above, the object processing module 108, in this example, also includes an object measurement module 110 that measures various properties of objects in the microscopy image 102 (e.g., size, shape, texture, pixel intensity, etc.).

The microscopy image analysis system 100, in this example, also includes a data integration and validation module 126. The data integration and validation module 126 integrates the data output by the multiple processing units 114. Additionally, the data integration and validation module 126 performs consistency checks to determine whether the resulting output data is valid or whether the resulting output data should be processed and analyzed further. Additional processing and analysis may be warranted, for example, to validate the presence of an object that straddles or is near the boundary of an image section. Data validation will be discussed in further detail below.

The preprocessing module 120 may preprocess the microscopy image 102 and prepare it for subsequent processing and analysis of the microscopy image sections. For example, the preprocessing module 120 may perform various image corrections before the microscopy image 102 is divided into image sections. Image corrections may include, for example, corrections to illumination or shading in the microscopy image 102. Image corrections may also include removing unwanted artifacts in the microscopy image 102 or removing elements in the microscopy image 102 that exceed a predetermined size threshold.

The preprocessing module 120 may also perform a preliminary scan of the microscopy image 102 to identify objects in the microscopy image 102. The preliminary object scan may use a relatively fast but somewhat crude procedure for preliminarily identifying objects in the microscopy image 102. As discussed below in further detail, the preliminary object scan may be used to determine an approximate maximum object size or to identify a set of image sections for subsequent parallel processing. The preliminary object scan may preliminarily identify objects in the microscopy image 102 by, for example, comparing the intensity of the pixels in the microscopy image 102 to a predetermined intensity threshold. Pixels that are above the intensity threshold may be identified as object pixels, and pixels below the intensity threshold may be identified as non-object pixels. The preliminary object scan in this example may then identify contiguous regions of object pixels in the microscopy image 102 and determine that the contiguous region of object pixels is an object in the microscopy image 102. Contiguous object pixels, in this example, refer to object pixels that are not separated by non-object pixels.

The image section determination module 116, in this example, determines the configuration for the microscopy image sections—for example, the number, size, and shape of the image sections that may be processed simultaneously in parallel. Various sizes and shapes may be selectively employed for the image sections. For example, the size and shape of the image sections may be based on the approximate maximum size of an object in the microscopy image 102. As mentioned above, the approximate maximum size of an object may be determined during a preliminary scan of the microscopy image 102.

In some implementations, the image section size may be determined based on the amount of memory available at the memory module 104 of the microscopy image analysis system 100. For example, the maximum section size may correspond to the amount of memory required to store the microscopy image 102. The memory requirement may be received from a user as user input or, additionally or alternatively, automatically determined by the image section determination module 116. The image section determination module 116 may determine the size of the image sections based on, for example, the amount of random access memory (RAM) at the microscopy image analysis system 100 or the amount of RAM available to the processing units 114. Determining the size of the image sections based on the amount of memory available or accessible at the microscopy image analysis system 100 may be useful where the microscopy image is a three-dimensional (3D) image and requires a relatively large amount of memory to store the 3D microscopy image. For example, consider that the processing distribution module 112 includes eight processing units 114 and the memory module 104 includes 512 MB (megabytes) of memory available for image processing. In this example, 64 MB of memory may be associated with each processing unit 114. Also consider a 16-bit microscopy image that uses two 8-bit bytes (16 bits total) to store each pixel value. In this example, each processing unit 114 may process a 32 MegaPixel image section, i.e., an image section having around 32,000,000 pixels (64 MB÷16 bits/pixel≈32,000,000 pixels). For a two-dimensional image, in this example, each processing unit 114 may simultaneously process in parallel two-dimensional 16-bit image sections having dimensions of around 5000×5000 pixels (25,000,000 pixels). For a three-dimensional image, in this example, each processing unit 114 may simultaneously process in parallel three-dimensional 16-bit image sections having dimensions of around 300×300×300 voxels (27,000,000 volumetric pixels—"voxels"). In some example implementations, the processing units 114 may allocate a portion of the available memory to store temporary images during image processing. In these example implementations, the size of the image sections may be selectively reduced to ensure enough memory will be available during image processing to store the temporary images.

The image section determination module 116 may define an image section as bounding coordinates that correspond to a coordinate system for the microscopy image 102. Accordingly, each section may be defined by a minimum x-coordinate, a maximum x-coordinate, a minimum y-coordinate, and a maximum y-coordinate.

Alternatively, the approximate maximum size of an object may be set by a user and received at the microscopy image analysis system 100 as user input. As another example, the size and shape of the microscopy image sections may be based on the number of processing units 114. If the microscopy image analysis system 100 includes four processing units 114, for example, then the image section determination module 116 may divide the microscopy image 102 into four image sections, each of which may be processed in parallel by one of the four processing units 114 respectively.

Figure 2:
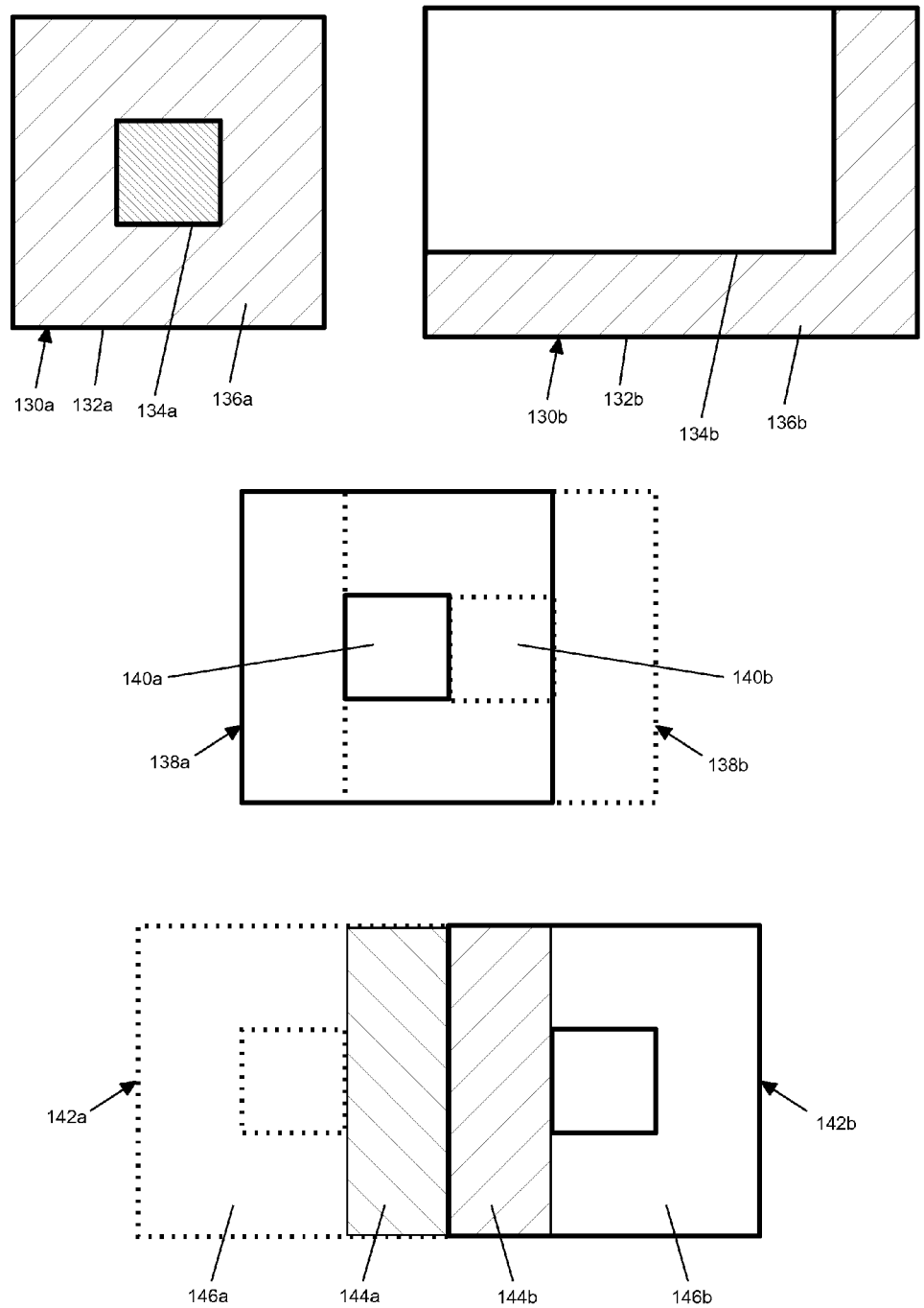
FIG. 2 illustrates multiple examples of image sections that may be used by a microscopy image analysis system to divide a microscopy image.

FIG. 2 includes two examples of image sections 130*a* and 130*b* that may be employed. The image sections 130*a* and 130b each have a respective search area 132a and 132b that includes a central area 134a and 134b and a margin 136a and 136b that at least partially surrounds the central area 134a and 134b.

In the first example image section 130a, the size of the image section 130a is based on the approximate maximum size of an object in a microscopy image. The central area 134a of the image section 130a in this example is around one maximum object size, and the surrounding margin 136a is also around one maximum object size in each direction. It will be understood that various sizes for the margin 136a may be selectively employed such as, for example, a margin 136a around one-half object size rather than one whole object size.

In the second example image section 130b, the size and shape of the image section 130b is based on the number of processing units at a microscopy image analysis system. As shown, the second example image section 130b is relatively larger overall and includes a relatively larger central area 134b. The margin 136b for the second image section 130b, in this example, is still around one maximum object size.

As discussed further below, the image sections for the microscopy image, in some example implementations, are arranged on the microscopy image in an overlapping fashion such that the central areas of the image sections are tiled across the microscopy image. FIG. 2 shows two overlapping image sections 138a and 138b with tiled central areas 140a and 140b respectively. In this example, the image sections and are arranged in an overlapping fashion so that each object in the microscopy image can fall into a central area of an image section.

Also discussed further below, where image sections are adjacent to one another, a neighboring area in one of the image sections may be defined that is adjacent to a neighboring area defined for the other image section. FIG. 2 also shows two adjacent image sections 142a and 142b each having adjacent neighboring areas 144a and 144b in the respective margins 146a and 146b of each image section 142a and 142b. The neighboring areas 144a and 144b may be selected for reevaluation when identifying objects in the microscopy image as discussed further below.

Figure 3:
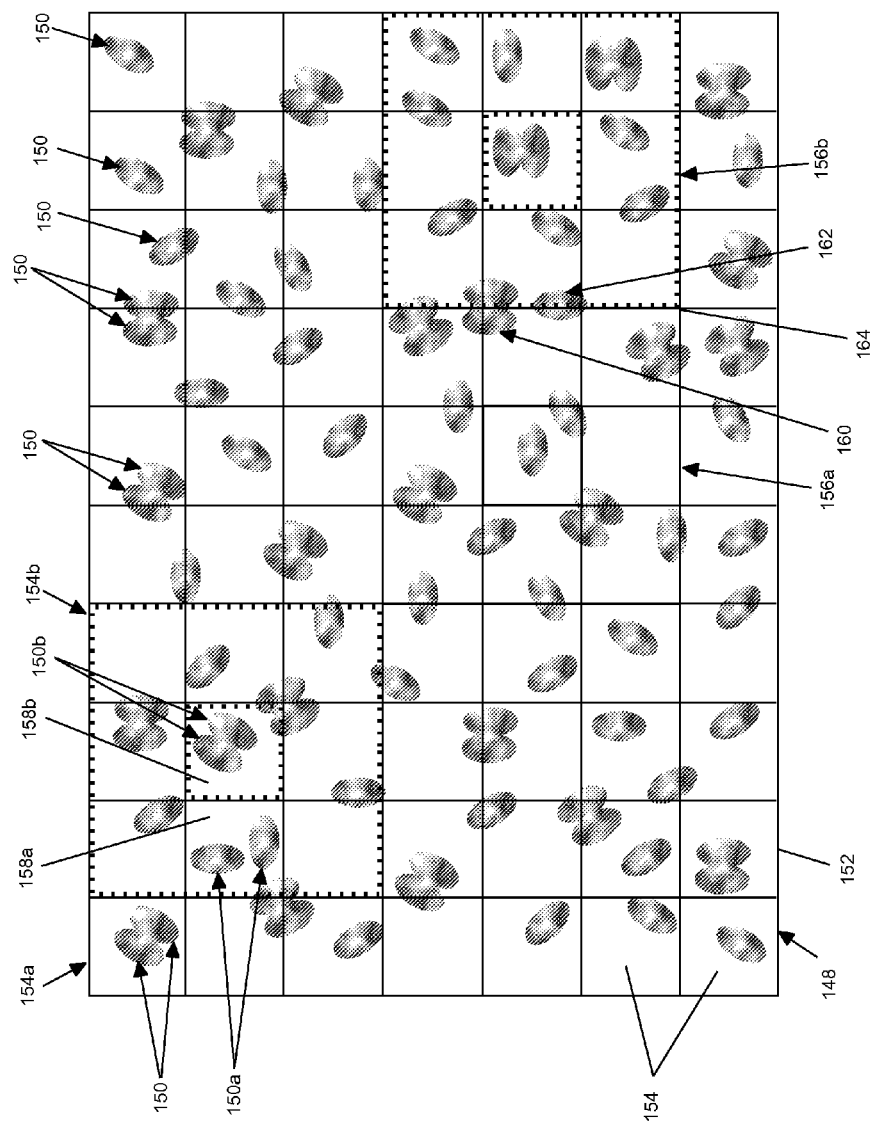
FIG. 3 is an example microscopy image divided into multiple image sections.

Referring now to FIG. 3, an example microscopy image 148 is shown. The microscopy image 148 includes multiple objects 150. For clarity, not all of the objects 150 are labeled in the example microscopy image 148. The microscopy image 148 in FIG. 3 has been divided into a grid 152 where each cell 154 of the grid 152 is around one maximum object size. Further, each cell 154 of the grid 152 may be the central area of an image section as illustrated by the overlapping image sections 154a and 154b and the adjacent image sections 156a and 156b shown by way of example in FIG. 3. As seen, the image sections 154a-b and 156a-b in FIG. 3 correspond to the image section 130a in FIG. 2 that is based on a maximum object size of the objects in the microscopy image. In this way, the central areas of the image sections are tiled as discussed above, and each object in the microscopy image may fall into one of the central areas as shown by way of example in FIG. 3. As seen in FIG. 3, some of the objects 150a and 150b are respectively enclosed by the central areas 158a and 158b of the overlapping image sections 154a and 154b.

As mentioned above, the image section determination module 116 (FIG. 1) may choose overlapping image sections such that the central areas of the image sections are tiled across the microscopy image. The image section determination module 116 may choose the image sections such that the central area of a subsequent image section begins at the pixel adjacent to the central area of the previous image section. Where it can be avoided, the image section determination module 116 may choose image sections such that the central areas do not overlap in order to reduce redundant processing. In some circumstances, however, overlapping central areas may result such as, for example, when processing the areas near the edges of the microscopy image 102.

FIG. 3 also shows how objects may straddle the boundary between adjacent image sections. As seen in FIG. 3, a pair of objects 160 and a singular object 162 straddle the boundary 164 between the adjacent image sections 156a and 156b. As discussed further below, the portion of the microscopy image 148 around the object between the adjacent image sections 156a and 156b may be reevaluated to confirm how many objects are present at this location in the microscopy image 148.

Figure 4:
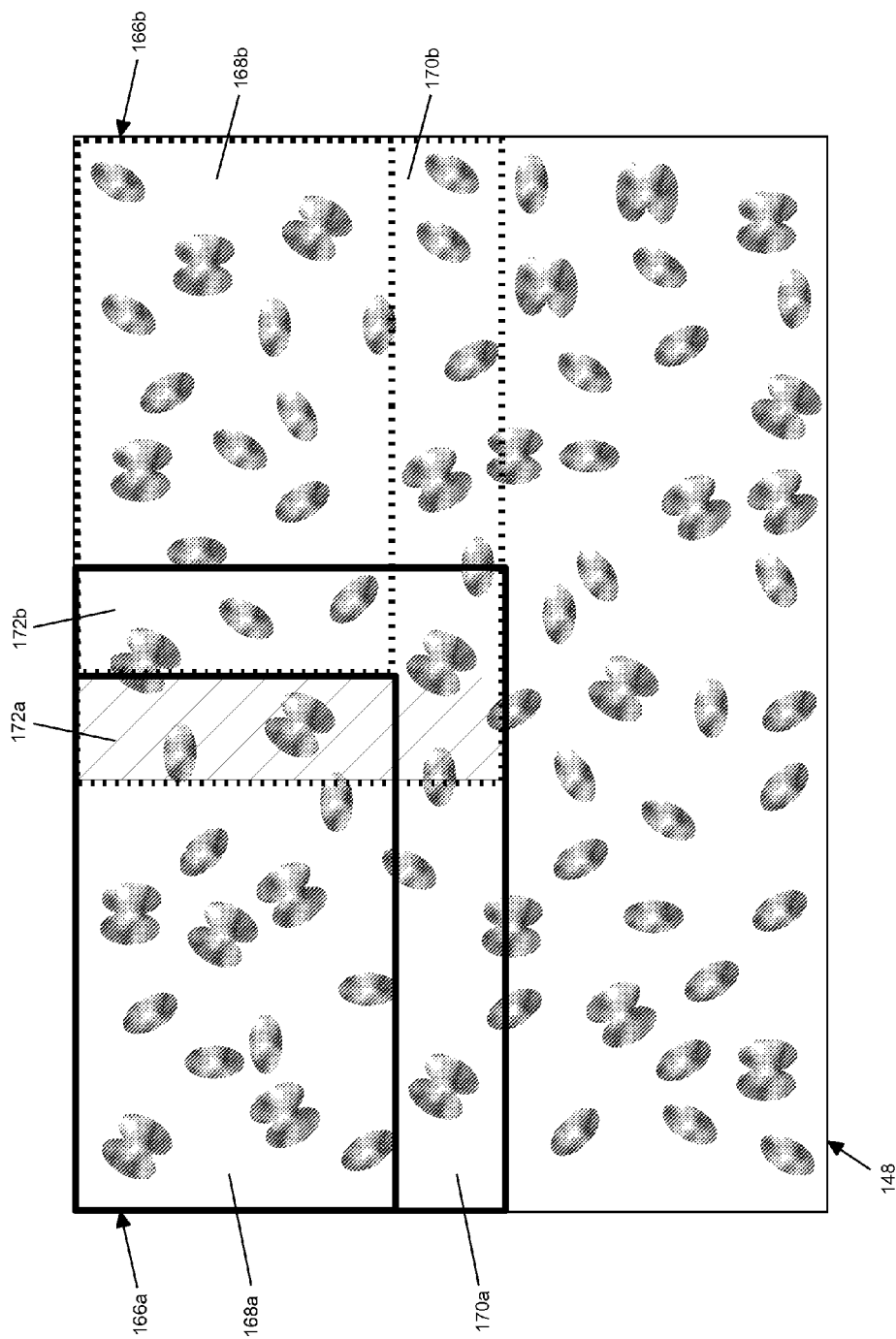
FIG. 4 is another example of a microscopy image divided into multiple image sections.

Referring to FIG. 4, the example microscopy image 148 of FIG. 3 is shown but with the relatively larger image sections 166a and 166b. The larger image sections 166a and 166b, in this example, correspond to the larger example image section 130b in FIG. 2 and therefore include larger central areas 168a and 168b. The image sections 166a and 166b in FIG. 4 may be used when the image section determination module 116 (FIG. 1) configures the image sections based on the number of processing units 114. In this example, the microscopy image 148 has been divided into four overlapping image sections 166a and 166b (two of which are shown in FIG. 4). As seen in FIG. 4, the larger example image sections 166a and 166b overlap each other at respective margins 170a and 170b for the image sections 166a and 166b. Also seen in FIG. 4, the neighboring areas 172a and 172b adjacent to the respective central areas 168a and 168b of each image section 166a and 166b may be used when reevaluating these portions of the microscopy image 148 during object identification.

Figure 5:
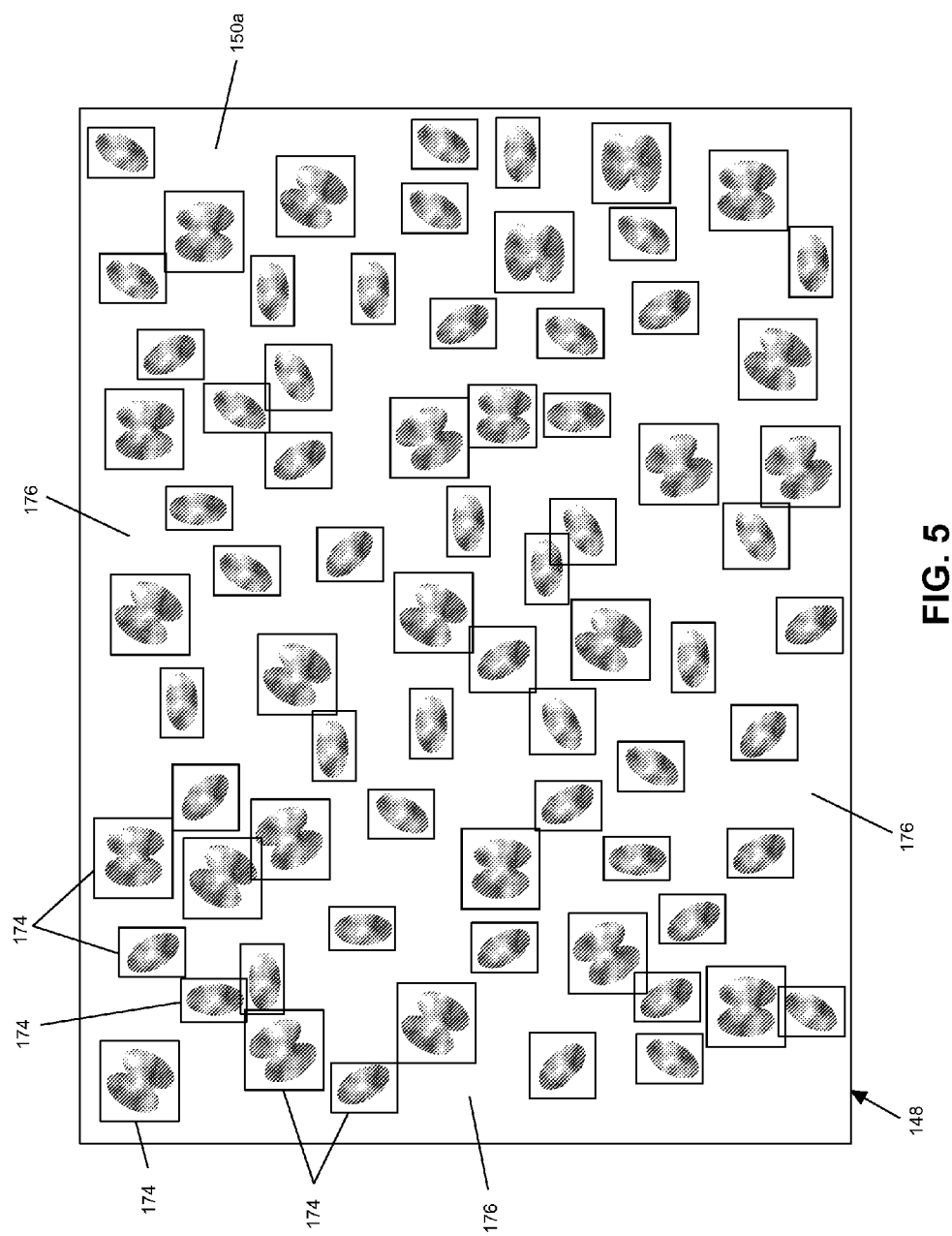
FIG. 5 is an additional example of a microscopy image divided into multiple image sections.

As mentioned above, a preliminary object scan of the microscopy image 148 may preliminarily identify objects in the microscopy image. In one example implementation, the image section determination module 116 may choose image sections based on the preliminary object scan and the preliminarily identified objects. FIG. 5 shows the example microscopy image 148 of FIGS. 3 and 4 where the number, size, and shape of the image sections 174 is based on a preliminary object scan. As seen in this example, an image section 174 is large enough to enclose at least one object and may enclose two objects that are close together. It can also be seen in this example that there may be some portions 176 of the microscopy image 148 that will not be processed further by the microscopy image analysis system 100—i.e., areas of the microscopy image 148 that were not preliminarily identified as having objects present.

Referring back to FIG. 1, the microscopy image analysis system 100 in this example also includes a processing management module 118 that coordinates the processing activities for processing and analyzing the microscopy image 102 and its objects. Processing activities may include, for example: preprocessing the microscopy image 102; determining the number, size, and shape of the image sections; detecting, segmenting, and measuring objects in the microscopy image 102; integrating and validating output data from the processing units 114; and measuring and analyzing the microscopy image 102 as a whole.

The other modules of the microscopy image analysis system 100 are in signal communication with the processing management module 118, and supply the processing management module 118 with the instructions to process, measure, and analyze the microscopy image 102 and its objects. The processing management module 118 coordinates the processing tasks and supplies the processing tasks and instructions to the processing distribution module 112 in turn. Because the modules of the microscopy image analysis system 100 are independent of the processing units 114, in this example, the modules of the microscopy image analysis system 100 may be selectively configured to employ various techniques for the processing activities. As discussed further below, a variety of object detection and segmentation techniques may be selectively employed. In this way, the modules of the microscopy image analysis system 100 in the example shown may be advantageously configured, modified, and updated to use various instruction sets. For example, customized image analysis sequences may be constructed from a library of image and object processing operations.

The processing management module 118 is in signal communication with the processing distribution module 112, which monitors the status of each processing unit 114. When a processing unit 114 is free to process an image section, the processing distribution module 112 assigns a processing task to the available processing unit 114 for processing and analysis. In this way, the processing distribution module 112 provides simultaneous processing of the processing tasks in parallel. As a result, the overall processing time for the entire microscopy image 102 is advantageously improved.

The processing management module 118 may maintain a queue of image sections for processing and a list of available processing units 114. If the number of image sections to process exceeds the number of available processing units 114, then the processing management module 118 may monitor the processing units 114 and assign the next image section in the queue to the next available processing unit 114.

Figure 6A:
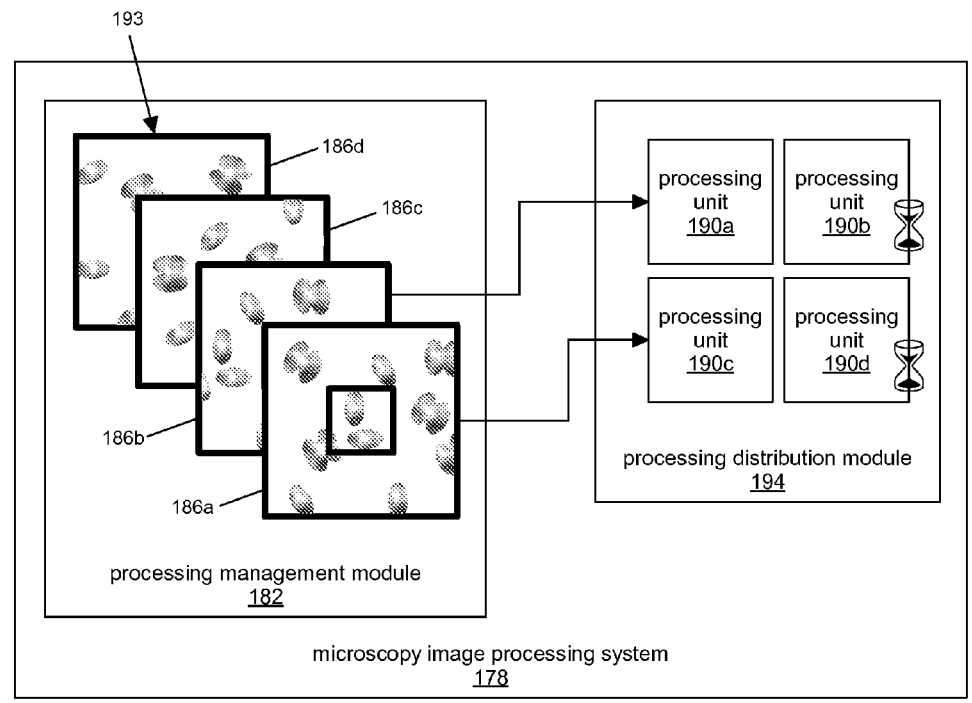
FIG. 6A is an example of an implementation of a microscopy image analysis systems illustrating the assignment of example image sections to processing units.
Figure 6B:
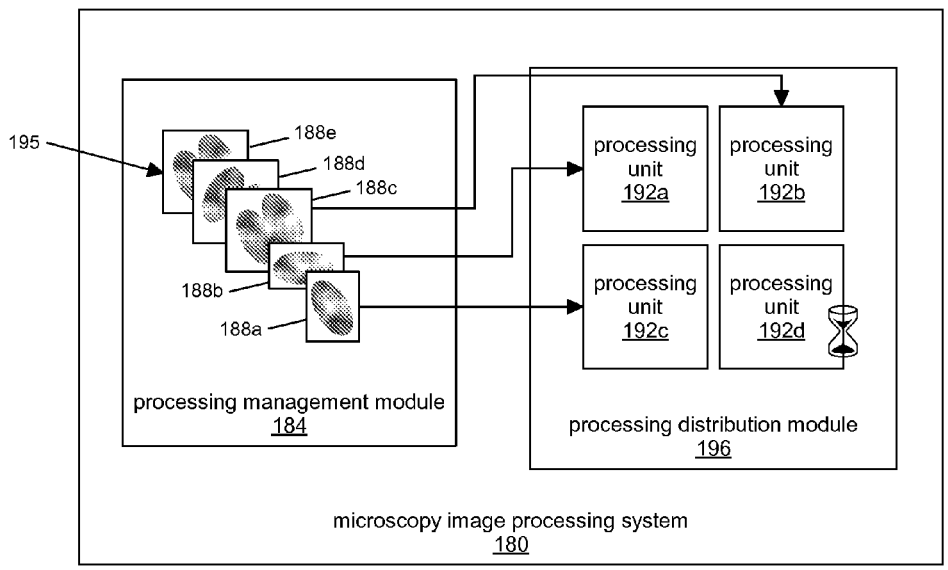
FIG. 6B is another example of an implementation of a microscopy image analysis system illustrating the assignment of example image sections to processing units.

FIG. 6A and FIG. 6B each include an example of an implementation of a microscopy processing system 178 and 180 illustrating how the respective processing management modules 182 and 184 may coordinate the processing of the respective image sections 186a-d and 188a-e by the respective processing units 190a-d and 192a-d of the processing distribution modules 194 and 196. In FIG. 6A, the image sections 186a-d are based on a maximum object size as discussed above. The processing management module 182 maintains an image section queue 193 for the unprocessed image sections 186a-d, which may be stored as, for example, a list of bounding coordinates, where each entry in the list respectively corresponds to the bounding coordinates for an image section 186a-d in the queue 193.

The processing distribution module 194 monitors the status of the processing units 190a-d and assigns the image sections 186a-d in the queue 193 to the processing units 190a-d as the processing units 190a-d become available. As seen in FIG. 6A, two processing units 190b and 190d are busy as indicated by the hourglass for the busy processing units 190b and 190d. The other two processing units 190a and 190c in this example, however, are available to process the image sections 186a-d. Accordingly, the processing distribution module 194 may respectively assign the first two image sections 186a and 186b in the image section queue 193 to the available processing units 190a and 190c.

In the example microscopy image processing system 180 of FIG. 6B, the image sections 188a-e are based on a preliminary object scan as discussed above. Accordingly, the image sections 188a-e in the image section queue 195, in this example, include at least one and up to two objects. Like the example above, the processing management module 184 may also store the image section queue 195 as a list of bounding coordinates respectively corresponding to the image sections 188a-188e in the image section queue 195. As seen in FIG. 6B, one of the processing units 192d is busy and the three other processing units 192a, 192b, and 192c are available to process the image sections 188a-e. Accordingly, the processing distribution module 196 respectively assigns the first three image sections 188a, 188b, and 188c in the image section queue 195 to the available processing units 192a, 192b, and 192c. The processing distribution modules 194 and 196 may be in signal communication with the object processing module 108 (FIG. 1) used to identify and measure objects in the microscopy image 102.

Referring again to FIG. 1, the object processing module 108, in this example, determines: whether an object is present in an image section of the microscopy image 102; the location of the detected objects; which pixels in the microscopy image 102 are respectively associated with the detected objects; and various measurements for the detected objects. As mentioned above, because the object processing module 108, in this example, supplies the processing management module 118 with the instructions for processing the microscopy image 102 and its objects, the object processing module 108 may be selectively configured to employ a variety of techniques to detect, segment, and measure the objects of a microscopy image 102.

Determining whether an object is present in the microscopy image 102 and determining the location of a detected object in the microscopy image 102 may be referred to as object detection. Accordingly, the object processing module 108, in this example, includes an object detection module 124. Determining which pixels in the microscopy image 102 are respectively associated with a detected object may be referred to as object segmentation. Accordingly, the object processing module 108, in this example, includes an object segmentation module 128. Measuring various properties of the objects in the microscopy image 102 (e.g., size, shape, texture, pixel intensity) may be referred to as object measurement, and the object processing module 108 in this example may include an object measurement module 110. The object processing module 108 may perform object detection, object segmentation, or object measurement in parallel by processing multiple image sections simultaneously at multiple respective processing units 114. It will be understood that object detection, object segmentation, and object measurement may be performed in any order. For some microscopy images 102, for example, the microscopy image 102 may be segmented and measured before object detection is performed, i.e., before the object detection module 124 determines whether an object is present in the microscopy image 102.

The object detection module 124, in this example, detects objects in the image sections of the microscopy image 102 and determines the locations of the objects in the microscopy image 102. Typically, the location for an object will be the position identified as the center of the object, and the location for an object will correspond to the position of the object in the microscopy image 102. When an object is detected, the object detection module 124 may also determine the location of the object in the microscopy image 102. The location of the object in the microscopy image 102 may correspond, for example, to the center of the detected object. The object detection module 124 may determine the center of a detected object based on, for example: the intensity center for the object, the pixels at the geographic center of the object, or the location for a best fit for an object template. The object intensity center, in this example, depends on the distribution of intensity pixels across an object in the microscopy image 102. In this way, the object intensity center is analogous to a center of mass where the location of the center of mass depends on the distribution of mass across a physical object.

FIG. 7A and FIG. 7B each include an example image section 198 and 200 respectively. The object detection module 124 (FIG. 1) may process each image section 198 and 200 to detect objects 202 and 204 in the image sections 198 and 200 and respectively determine the locations of the object centers. The example image sections 198 and 200 in FIG. 7A and FIG. 7B respectively correspond to the overlapping image sections 154*a* and 154*b* in FIG. 3. As seen in FIG. 7A and FIG. 7B, the object detection module 124 has determined respective center locations 206 and 208 for each object 202 and 204 in the example image sections 198 and 200.

In particular, the object detection module 124 has detected two objects 202*a* and 202*b* in the central area 210 of the example image section 198 in FIG. 7A. The object detection module 124 has also detected two objects 204*a* and 204*b* in the central area 212 of the example image section 200 in FIG. 7B. Additionally, because the example image sections 198 and 200 overlap, the objects 202*a* and 202*b* identified in the central area 210 of the image section 198 of FIG. 7A appear in the left-side margin 214 of the image section 200 in FIG. 7B. Similarly, the objects 204*a* and 204*b* identified in the central area 212 of the image section 200 in FIG. 7B appear in the right-side margin 216 of the image section 198 in FIG. 7A.

To reduce the potential for duplicative objective identification, some example implementations may limit the results of the object detection process to only those objects within the central area of the image section. As shown by way of example in FIG. 7A and FIG. 7B, the object detection module 124 may discard the locations 206 and 208 for detected objects 202 and 204 that are located in the margins 216 and 214 outside of the respective central areas 210 and 212. As a result, the object detection module 124 may only return object detection results for the two objects 202*a* and 202*b* in the central area 210 of the first example image section 198 and for the two objects 204*a* and 204*b* in the central area 212 of the second example image section 200.

The object detection module 124 and the object segmentation module 128 (FIG. 1) may rely on various image properties to respectively detect and segment the objects in a microscopy image section. For example, the object detection module 124 and the object segmentation module 128 may analyze the intensity of the pixels in the image section, or the size, shape, and texture of various elements in the image section. In this way, the object detection module 124 may determine whether objects are present in the image section and the object segmentation module 128 may determine which pixels in the image sections are respectively associated with those objects.

One technique that relies on the intensity of the pixels in the image section compares the intensity of the pixels to a predetermined intensity threshold. The predetermined intensity threshold may be based on the expected intensity for an object. If the pixel intensity equals or is above the predetermined intensity threshold, then the object detection module 124 may identify the pixel as an object pixel. If the pixel intensity is below the intensity threshold, however, then the object detection module 124 may designate the pixel as a non-object pixel. Once the object detection module 124 has identified the object pixels and the non-object pixels, the object segmentation module 128 may group the object pixels using, for example, a connected component labeling procedure. The object segmentation module 128 may identify the groups of pixels as the objects in the image segment. Additionally, after the object segmentation module 128 determines which pixels are associated with the detected objects, the object detection module 124 may analyze the pixels to determine the location of the center of the object in the image section.

The object segmentation module 128 may also perform a watershed transformation on an image section to respectively assign pixels in the image section to detected objects. This watershed transformation approach also relies on pixel intensity to determine which detected object a pixel is associated with. The object segmentation module 128 may consider the image section as a topographic mapping where, for example, the pixel intensities correspond to watershed lines, i.e., object boundaries. The object segmentation module 128 may assign pixels to objects based on their position relative to a watershed line. For example, the object segmentation module 128 may assign pixels enclosed by a common watershed line to the object whose boundaries correspond to the watershed line. The object detection module 124 may then determine the center of the enclosed watershed line and identify the center as the center of the detected object.

The object detection module 124 may also use edge-based segmentation to detect the boundaries of objects in an image section. Detected edges may define enclosed regions in the image section, and the object detection module 124 may identify the closed regions in the image section as objects. Additionally, the object segmentation module 128 may assign the pixels enclosed by a detected edge to the object corresponding to the closed region of the detected edge. The object detection module 124 may also identify the center of the enclosed region as the center of the detected object.

The object detection module 124 may also rely on the size and shape of the objects in the image section to detect objects in the image section. One approach that relies on the size and shape of the objects in the image section is template matching (i.e., model-based segmentation). For template matching, the object detection module 124 performs a cross-correlation match between a template and each pixel in the image section. The object segmentation module 128 may determine that a pixel is associated with an object when that pixel has a high correlation with the template. The template may be, for example, a sample object or an artificial signal having a Gaussian peak of the object size.

The object detection module 124 may also employ machine learning techniques such as, for example, neural networks and Bayesian analysis, to detect objects in an image section. The object detection module 124 may include a learning algorithm that is initially supplied with a sample set of image sections where the presence or absence of objects in the image sections is known. The learning algorithm may derive the distinguishing features of the objects based on the known sample set of image sections. The learned state may be stored and subsequently applied to unknown image sections to detect the presence of objects in the image sections. Alternatively in some implementations, the object detection module 124 may supply a trained machine learning system or a trained classification system with the pixels of the microscopy image 102, and the trained systems may identify the objects based on the supplied pixels.

The object detection module 124 may also employ a multi-scale segmentation approach to detect objects in an image section. For the multi-scale segmentation approach, the object detection module 124 may detect the presence of objects in an image section based on peaks associated with various wavelet functions performed on the image section. In this example approach, the wavelet peaks correspond to the objects in the microscopy image 102. As another example, the object detection module 124 may manipulate the pixels in the microscopy image 102 on multiple scales to create a binary mask. The binary mask may then be applied to the original pixels or modified pixels to determine the locations of objects in the microscopy image 102.

The techniques described above for detecting the presence of object in the microscopy image 102 may be mixed-and-matched. It will also be understood that other suitable techniques and approaches for detecting objects in the microscopy image 102 and determining which pixels in the microscopy image 102 are associated with detected objects may be selectively employed.

The object detection module 124 and the object segmentation module 128 may store information relating to detected objects as object data 106 of the memory module 104 (FIG. 1). For example, data structures in the memory module 104 may store a list of detected objects, the locations of the center of the objects in the image section, and a list of pixels associated with the detected objects.

Figure 8:
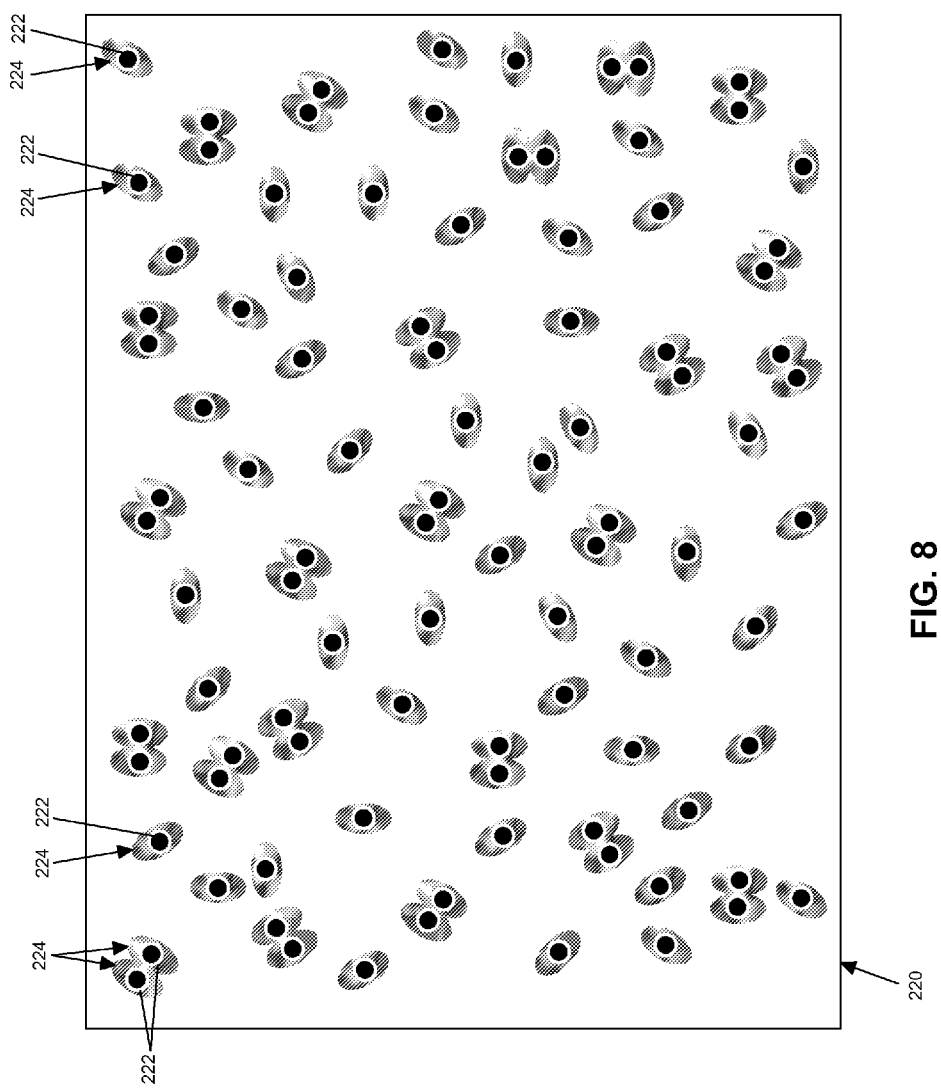
FIG. 8 is an example of a microscopy image that includes indications of the locations for objects identified in the example microscopy image.

Because the multiple image sections of the microscopy image 102, in this example, are processed simultaneously in parallel by different processing units 114, the microscopy image analysis system 100 in FIG. 1 also includes a data integration and validation module 126 to integrate and validate the object detection and segmentation results. For example, the data integration and validation module 126 may combine the object data 106 generated by the various processing units 114 for the multiple image sections into object data 106 for the microscopy image 102 as a whole. Integrated object data 106 may include, for example, a result image showing the centers for the detected objects. FIG. 8 is an example result image 220 that may be generated following object detection, object segmentation, and data integration. As seen in FIG. 8, the data for the various image sections has been combined, and a center location 222 has been determined for each detected object 224.

Data integration may also include evaluating the object data for each image section and determining whether any portions of the microscopy image 102 should be reevaluated. The data integration and validation module 126 may reevaluate portions of the microscopy image 102 to avoid duplicative object identification. Duplicative object identification may result where an object straddles the boundary between image sections, which can result in separate processing units 114 each detecting the presence of an object at a common location. Accordingly, when multiple objects are detected at similar locations near a boundary between image sections, the data integration and validation module 126 may determine that reevaluation of the area around the similar locations is warranted to confirm whether one or two objects are present.

Figure 9:
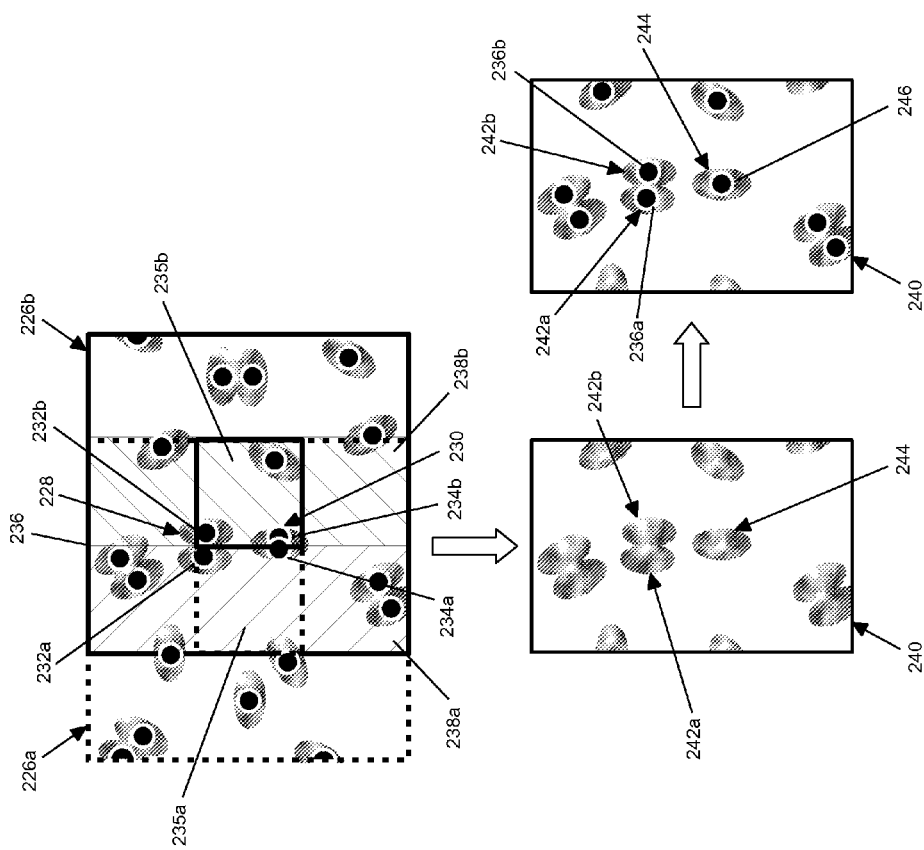
FIG. 9 is an example of adjacent image sections showing the reevaluation process.

FIG. 9 includes two example image sections 226a and 226b where the microscopy image analysis system 100 (FIG. 1) has identified two sets 228 and 230 of multiple locations 232a-b and 234a-b near the boundary 236 for the central areas 235a and 235b. As seen in FIG. 9, locations 232a-b and 234a-b for each respective location set 228 and 230 are in close proximity to each other. The first set of locations 228 corresponds to two adjacent objects that straddle the central area boundary 236. The second set of locations 230 corresponds to a single object that straddles the central area boundary 236. The dual locations 234a-b for the single object represent an undesired duplicative object detection. Because of the proximity of the locations 232a-b and 234a-b in each respective location set 228 and 230 and because of the proximity of the locations to the central area boundary 236, the data integration and validation module 126 (FIG. 1) may determine that reevaluation of the area around the suspect locations 232a-b and 234a-b is warranted.

For reevaluation, the data integration and validation module 126 may select a portion of the microscopy image surrounding the suspect locations such as, for example, the neighboring areas 238a and 238b of the adjacent image sections 226a and 226b in FIG. 9. The surrounding area may be reevaluated as a new individual image section for processing and analysis at a single processing unit 114. Where neighboring areas of adjacent image sections are selected, the neighboring areas may be merged into a new image section 240 as shown by way of example in FIG. 9. In the new image section 240 of FIG. 9, the objects 242a, 242b, and 244 respectively corresponding to the suspect locations 232a-b and 234a-b are near the center of the new image section 240 rather than straddling a boundary between adjacent image sections. Because only one processing unit 114 processes and analyzes the new image section 240, the object detection module 124 can determine whether one object or two objects are present at the suspect locations 232a-b and 234a-b.

In this example, reevaluation of the new image section 240 may indicate that this area of the new image section 240 does include two adjacent objects 242a and 242b and validate the locations 236a and 236b for the two adjacent objects 242a and 242b. Reevaluation of the new image section 240, in this example, may also indicate that there is only a single object 244 below the adjacent objects 242a-b and invalidate the two determined locations 234a-b for the single object 244. The object detection module 124 may then determine a new, valid location 246 for the singular object 244, and update the object detection results accordingly.

Referring again to FIG. 1, the microscopy image analysis system 100 includes an object measurement module 110 that performs measurements on the microscopy image 102 based on the pixels respectively associated with the detected objects. The object measurement module 124 may analyze the pixels to determine various characteristics for the detected objects. Object measurements may include, for example, the average intensity for an object (e.g., the gray level of the object pixels), the size of an object based on the area of the object pixels, the length of the perimeter of an object, the shape of an object, and the texture of an object (e.g., the variation in gray levels of the object pixels). Object measurements may also include measurements of detected objects across a series of microscopy images. For example, multiple microscopy images may be obtained under varying illumination conditions and the object measurement module may measure fluorescence ratios or colocalization information for the detected objects in series of microscopy images. Object measurement data may be stored as object data 106 in the memory module 104 as, for example, a table of measurement values respectively associated with the detected objects. It will be understood that object measurements may include additional or alternative information about the object pixels for the detected objects. Like object detection and object segmentation, object measurement may also be performed simultaneously in parallel at multiple processing units 114. The object data 106 may be assigned to individual processing units 114 for parallel processing and analysis by the object measurement module 110.

The microscopy image analysis system 100 in FIG. 1 also includes a microscopy image measurement module 122 that measures the microscopy image 102 as a whole. In this example, the image measurement module 122 may measure the microscopy image 102 as a whole based on the detected objects in the microscopy image 102. For example, the image measurement module 122 may count the total number of detected objects in a microscopy image 102 or track detected objects across a series of microscopy images. The image measurement module 122 may also perform measurements of multiple objects such as, for example, the distance between objects. The image measurement module 122 may also perform statistical measurements such as, for example, averages, standard deviations, etc. for individual objects measurements, e.g., average pixel intensity for all detected objects and standard deviation of pixel intensity for all detected objects.

The microscopy image analysis system 100 may also include an object search module (not shown) that searches (i.e., "hunts") for objects in the microscopy image 102. The object search module would assign respective locations in the microscopy image 102 to multiple processing units 114 that search the assigned areas simultaneously in parallel. If two processing units 114 converge on a common location and each detect an object at the common location, the object search module would identify only one object at the common location. The object search module may also employ various techniques to speed up the search process. For example, the object search module may perform a simulated annealing on the microscopy image or other metaheuristic techniques to reduce the size of the search space.

Figure 10:
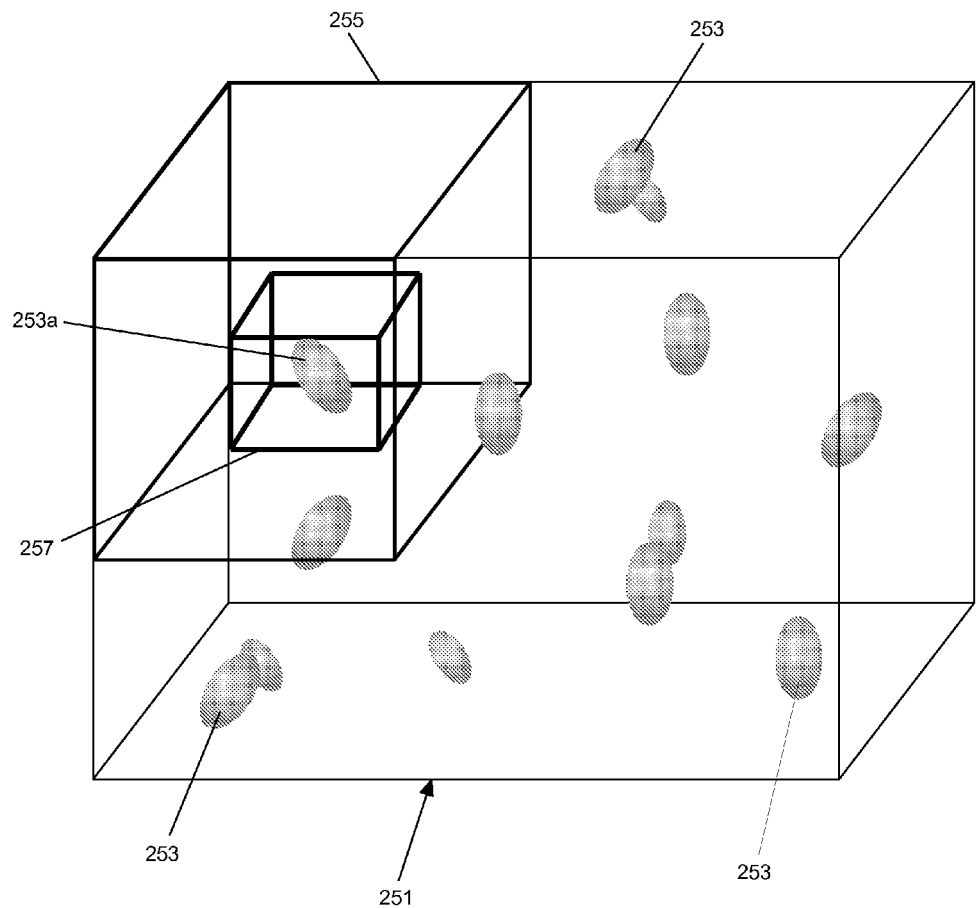
FIG. 10 is an example of a three-dimensional microscopy image.

As mentioned above, the microscopy image 102 may be a 3D microscopy image. Referring to FIG. 10, an example of a 3D microscopy image 251 that includes 3D objects 253 is shown. The 3D microscopy image 251 may be sectioned using a 3D image section 255 having a 3D central area 257 as shown by way of example in FIG. 10. As seen in this example, a 3D object 253a is located within the 3D central area 257 of the 3D image section 255.

A 3D microscopy image may be, for example, a series of two-dimensional microscopy images that each depicts a plane (i.e., a z-plane) of the 3D microscopy image. Other formats for the 3D microscopy image may be selectively employed such as, for example, MPEG-encoding (Moving Picture Experts Group) to organize the image data into (x, y, z) coordinates.

For a 3D microscopy image comprised of a series of two-dimensional images, each two-dimensional image in the series may represent a z-plane. If the distance between z-planes is known, then the pixels of the microscopy images may correspond to three-dimensional cube, or voxel. The principles and techniques discussed above may be extended to identify and measure three-dimensional objects. For example, instead of a two-dimensional image section, three-dimensional blocks of voxels may be assigned to multiple processing units 114 for simultaneous processing in parallel. Similar preprocessing operations may be used to preprocess the three-dimensional microscopy image. For example, a pre-processing operation may be performed to remove noise in the three-dimensional microscopy image. Additionally or alternatively, three-dimensional wavelet analysis may be performed on a block of voxels or blocks of voxels may be passed to a machine learning algorithm.

Figure 11:
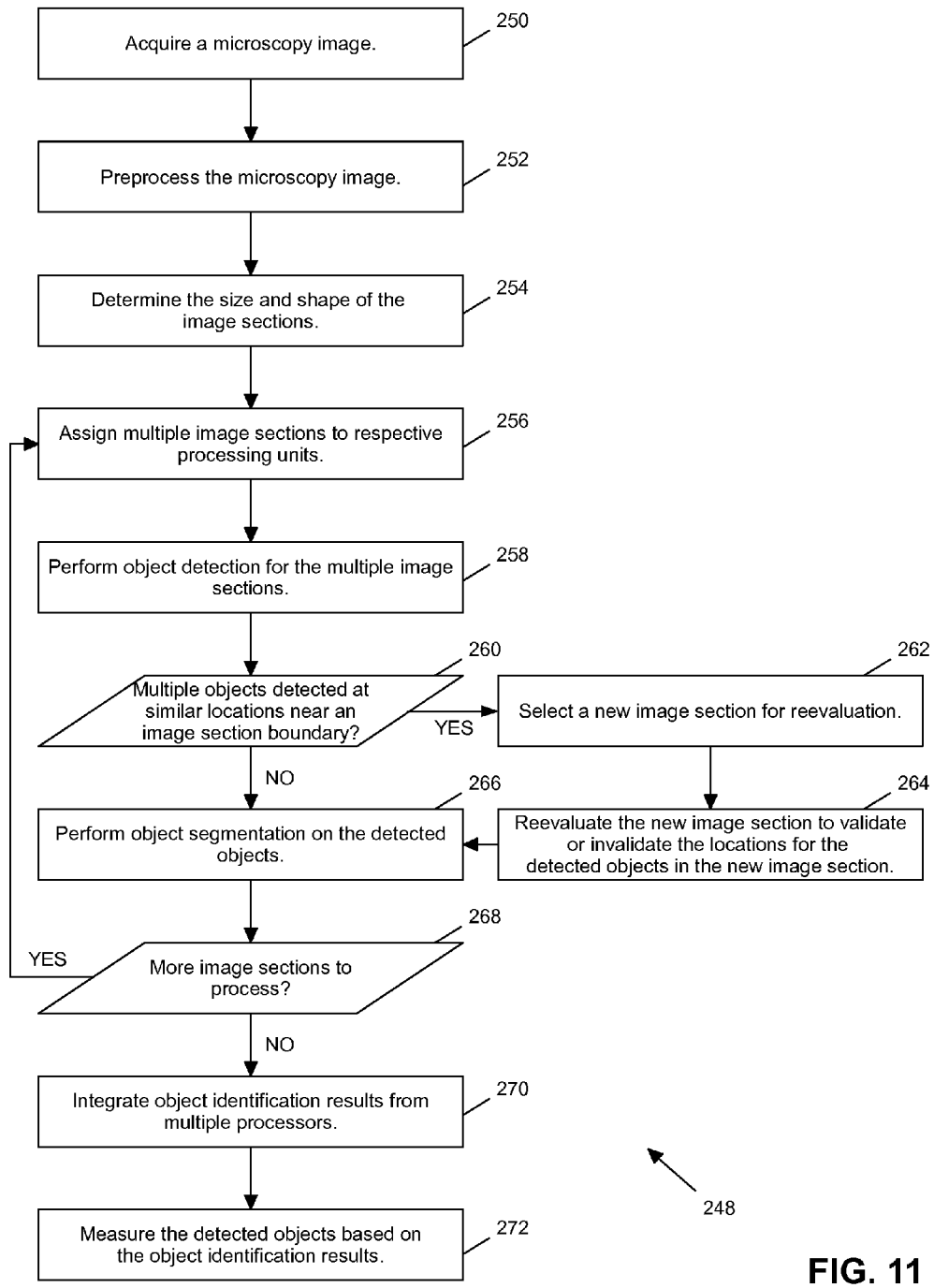
FIG. 11 is a flowchart of example method steps for identifying and measuring objects in a microscopy image.

Referring now to FIG. 11, a flowchart 248 of example method steps for identifying and measuring objects in a microscopy image is shown. First, a microscopy image is acquired (step 250). As discussed above, a series of multiple microscopy images may be acquired to identify and measure objects in the series of microscopy images. The microscopy image may be preprocessed (step 252) before it is divided into image sections that are further processed simultaneously in parallel. As discussed above, preprocessing may scan or adjust the microscopy image to correct the illumination or shading in the microscopy image, remove unwanted artifacts in the microscopy image, remove elements from the microscopy image that exceed a certain size threshold, or preliminarily identify objects in the microscopy image using a crude object identification process.

Next, the size and shape for the image sections used to process portions of the microscopy image in parallel are determined (step 254). As discussed above, the size and shape of the image sections may be based on a variety of factors including, for example, a predetermined maximum object size, the number of processing units that will process the image sections, or the preliminary object detection scan. In some implementations, the image sections may overlap such that the central area of the image sections are tiled across the microscopy image allowing each object in the microscopy image to fall within a central area of at least one image section.

Once the image sections have been determined, image sections containing a portion of the microscopy image are assigned to the processing units (step 256). An image section queue may be maintained if the number of image sections exceeds the number of processing units. As processing units become available the image sections at the front of the queue may be assigned to the newly available processing units accordingly. In this way, multiple image sections may be processed simultaneously in parallel.

An object detection process is performed for each image section (step 258). As discussed above, object detection involves determining that an object is present in the image section of the microscopy image and determining a location for the object in the microscopy image. Object detection may be performed simultaneously in parallel at multiple processing units. The approaches and techniques discussed above may be selectively employed to detect objects in the image sections. Other approaches and techniques suitable for detecting objects may be selectively employed as well.

If multiple objects are detected at similar locations and those locations are located near an image section boundary (step 260), then a new image section may be selected for reevaluation (step 262). The new image section may be, for example, the portion of the microscopy image surrounding the similar locations for the detected objects such that the locations do not appear at or near the boundary of the new image section. In this way, the new image section may be reevaluated to validate or invalidate the locations for the detected objects (step 264). If reevaluation of the new image section determines that only one object is present, then the previously determined locations may be invalidated and a new, valid location for the detected object may be determined. If reevaluation of the new image section determines that two objects are actually present, then the previously determined locations may be validated.

Once objects have been detected, object segmentation may be performed on the image section to identify which pixels in the image section are respectively associated with the detected objects (step 266). Object segmentation may also be processed simultaneously at multiple processing units. The approaches and techniques discussed above may be selectively employed to determine which pixels in the image section are associated with the detected objects. Other approaches and techniques suitable for object segmentation may also be selectively employed as well.

As mentioned above, the number of image sections to process may exceed the number of processing units. Therefore, if there are more image sections to process (step 268), then one or more of the remaining image sections may be respectively assigned to available processing units (step 256).

Once the image sections have been processed and analyzed, the object identification results may be integrated as object data for the microscopy image (step 270). The integrated object data may include, for example, a list of detected objects in the microscopy image and their respective locations in the microscopy image, a list of pixels in the microscopy image that are respectively associated with the detected objects, and a result image that includes indications of the locations for the detected objects.

Once the object data has been acquired for the microscopy image and the objects of the microscopy image, the objects may be measured to identify various characteristics for the detected objects (step 272). Object measurement may include, for example, object pixel intensity, object area size, object perimeter length, object shape, object texture. Where objects are measured across multiple images (e.g., under different illumination conditions) object measurements may include fluorescence ratios and colocalization information. Where objects are three dimensional, object measurements may include the volume of the object.

In this example, object detection, object segmentation, and object measurement are each respectively performed on multiple processing units in parallel. It will be understood, however, that object segmentation and object measurement may be performed on a single processing unit once the objects in the microscopy image have been identified. Performing at least object detection in parallel using multiple processing units improves the efficiency of processing and analyzing a microscopy image.

It will be understood and appreciated that one or more of the processes, sub-processes, and process steps described in connection with FIGS. 1-5, 6A-B, 7A-B, 9, and 11 may be performed by hardware, software, or a combination of hardware and software on one or more electronic or digitally-controlled devices. The software may reside in a software memory (not shown) in a suitable electronic processing component or system such as, for example, one or more of the functional systems, devices, components, modules, or sub-modules schematically depicted in FIG. 1. The software memory may include an ordered listing of executable instructions for implementing logical functions (that is, "logic" that may be implemented in digital form such as digital circuitry or source code, or in analog form such as an analog source such as an analog electrical, sound, or video signal). The instructions may be executed within a processing module, which includes, for example, one or more microprocessors, general purpose processors, combinations of processors, DSPs, or ASICs. Further, the schematic diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units.

The executable instructions may be implemented as a computer program product having instructions stored therein which, when executed by a processing module of an electronic system (e.g., a microscopy image analysis system 100 in FIG. 1), direct the electronic system to carry out the instructions. The computer program product may be selectively embodied in any non-transitory computer-readable storage medium for use by or in connection with an instruction execution system, apparatus, or device, such as a electronic computer-based system, processor-containing system, or other system that may selectively fetch the instructions from the instruction execution system, apparatus, or device and execute the instructions. In the context of this document, a computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access memory (electronic); a read-only memory (electronic); an erasable programmable read only memory such as, for example, Flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program can be electronically captured via, for instance, optical scanning of the paper or other medium, then compiled, interpreted, or otherwise processed in a suitable manner if necessary, and then stored in a computer memory or machine memory.

It will also be understood that the term "in signal communication" as used in this document means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A computer-implemented method of processing a microscopy image comprising:
   receiving the microscopy image;
   determining a configuration for an image section that includes a portion of the microscopy image;
   assigning a plurality of image sections of the microscopy image to a plurality of processing units respectively;
   processing the plurality of image sections substantially simultaneously in parallel at the processing units, wherein each processing unit processes the image section assigned thereto to identify one or more objects present in the image section;
   determining that a location in the microscopy image of a first object identified in a first image section is proximate a location in the microscopy image of a second object identified in a second image section; and
   processing the microscopy image further to determine if the first object and the second object correspond to a single object or two different objects.

2. The computer-implemented method of claim 1, further comprising determining locations for the objects present in the microscopy image wherein the locations correspond to the position of the objects in the microscopy image.

3. The computer-implemented method of claim 1, wherein the microscopy image comprises a grid of pixels and further comprising determining which pixels of the microscopy image are associated with the objects present in the microscopy image.

4. The computer-implemented method of claim 1, further comprising:
   determining that a plurality of objects are present at a boundary between the first image section and the second image section;
   selecting a first portion of the microscopy image wherein the first portion is included in the first image section and selecting a second portion of the microscopy image wherein the second portion is included in the second image section in order to obtain a new image section that includes the first portion, the second portion, and the plurality of objects; and
   determining that one or more objects are present in the new image section.

5. The computer-implemented method of claim 1, wherein:
   the image section includes a central area and a margin; and
   a configuration of the margin corresponds to a predetermined object size.

6. The computer implemented method of claim 5, wherein the image sections overlap such that the respective central areas of the image sections are tiled across the microscopy image.

7. The computer-implemented method of claim 1, further comprising:
   preprocessing the microscopy image to preliminarily identify objects in the microscopy image; and
   configuring one or more image sections such that the image sections correspond to the preliminarily identified objects.

8. The computer-implemented method of claim 1, further comprising:
   acquiring a series of microscopy images;
   determining that the first object is present in a first microscopy image in the series and determining that the second object corresponding to the first object is present in a second microscopy image in the series; and
   measuring the first object and the second object to obtain object data associated with a relationship between the first object and the second object.

9. The computer-implemented method of claim 1, where the microscopy image is a three-dimensional image and further comprising:
   determining that at least a portion of a three-dimensional object is present in the three-dimensional image; and
   measuring the three-dimensional object to obtain object data associated with the three-dimensional object.

10. The computer-implemented method of claim 1, where the configuration for the image section is determined based on a predetermined amount of memory.

11. A system for processing a microscopy image comprising:
   an image section determination module that determines a configuration for an image section wherein the image section includes a portion of the microscopy image;
   a processing management module that respectively assigns a plurality of image sections of the microscopy image to a plurality of processing units, the processing units process the plurality of image sections substantially simultaneously in parallel, wherein each processing unit processes the image section assigned thereto to identify one or more objects present in the image section; and
   a data integration and validation module that determines if a location in the microscopy image of a first object identified in a first image section is proximate a location in the microscopy image of a second object identified in a second image section; wherein
   the data integration and validation module further processes the microscopy image to determine if the first object and the second object correspond to a single object or two different objects.

12. The system of claim 11, further comprising an object detection module that determines locations for the objects present in the microscopy image wherein the locations correspond to the position of the objects in the microscopy image.

13. The system of claim 11, wherein the microscopy image comprises a grid of pixels and further comprising an object segmentation module that determines which pixels of the microscopy image are associated with the objects present in the microscopy image.

14. The system of claim 11, further comprising a data validation module that:
   determines that a plurality of objects are present at a boundary between the first image section and the second image section; and
   selects a first portion of the microscopy image wherein the first portion is included in the first image section and selects a second portion of the microscopy image wherein the second portion is included in the second image section in order to obtain a new image section that includes the first portion, the second portion, and the plurality of objects such that the object identification module determines whether one or more objects are present in the new image section.

15. The system of claim 11, wherein:
   the image section includes a central area and a margin; and
   a configuration of the margin corresponds to a predetermined object size.

16. The system of claim 15, wherein the images sections overlap such that the respective central areas of the images sections are tiled across the microscopy image.

17. The system of claim 11, further comprising:
   a preprocessing module that preprocesses the microscopy image to preliminarily identify objects in the microscopy image; and
   wherein the image section determination module configures one or more image sections such that the image sections correspond to the preliminarily identified objects.

18. The system of claim 11, wherein:
   a series of microscopy images are acquired;
   the object identification module determines that a first object is present in the first microscopy image in the series and determines that the second object corresponding to the first object is present in a second microscopy image in the series; and
   the object measurement module measures the first object and the second object to obtain object data associated with a relationship between the first object and the second object.

19. The system of claim 11, wherein:
   the microscopy image is a three-dimensional image;
   the object identification module determines that at least a portion of a three-dimensional object is present in the three-dimensional image; and
   the object measurement module measures the three-dimensional object to obtain object data associated with the three-dimensional object.

20. The system of claim 11, wherein the image section determination module determines the configuration for the image section based on a predetermined amount of memory.

* * * * *